(12) United States Patent
Vandergeest

(10) Patent No.: US 6,975,727 B1
(45) Date of Patent: Dec. 13, 2005

(54) DYNAMIC SECURITY CREDENTIAL GENERATION SYSTEM AND METHOD

(75) Inventor: Ronald J. Vandergeest, Kanata (CA)

(73) Assignee: Entrust Limited, Ottawa (CA)

( * ) Notice: Subject to any disclaimer, the term of this patent is extended or adjusted under 35 U.S.C. 154(b) by 0 days.

(21) Appl. No.: 09/337,964

(22) Filed: Jun. 22, 1999

(51) Int. Cl.[7] ............................................. H04L 9/00
(52) U.S. Cl. ...................... 380/277; 380/273; 713/175; 713/180
(58) Field of Search ................ 380/277, 279, 380/278, 273; 713/171, 180, 175

(56) References Cited

U.S. PATENT DOCUMENTS

| | | | |
|---|---|---|---|
| 5,495,533 A * | 2/1996 | Linehan et al. | 380/277 |
| 6,230,269 B1 * | 5/2001 | Spies et al. | 380/279 |
| 2001/0003828 A1 * | 6/2001 | Peterson et al. | 709/219 |

OTHER PUBLICATIONS

Preliminary Specification, X/Open Single Sign-On Service (XSSO)—Pluggable Authentication Modules, Jun. 1997, The Open Group, pp. 9-11, 15-24, 62, 70, 72, 77, 83, 110, 114.*

* cited by examiner

*Primary Examiner*—Gilberto Barrón, Jr.
*Assistant Examiner*—Benjamin E. Lainer
(74) *Attorney, Agent, or Firm*—Vedder, Price, Kaufman & Kammholz, P.C.

(57) ABSTRACT

An apparatus and method dynamically creates security keys for a subscriber, having at least one preexisting security credential set, and allows the configuration for N key pairs or N keys (where the cryptographic system is a symmetric key system). Such a system provides flexibility in assigning cryptographic algorithms and cryptographic keys to facilitate a change in algorithm without requiring reinitialization of a processing unit or subscriber. The apparatus and method provides a configurable security key manifest, such as a template or table, operative to contain a non-prespecified number of security keys. A security officer or other source may input key configuration data to a graphic user interface template or other suitable mechanism to configure the security key manifest. Once configured (populated), the apparatus dynamically controls the generation of at least one new security key for the subscriber based on received key attribute data and based on the differences in current and prior security key manifests.

51 Claims, 4 Drawing Sheets

DYNAMIC SECURITY CREDENTIAL GENERATION SYSTEM AND METHOD

FIELD OF THE INVENTION

The invention relates generally to security credential creation systems and methods and more particularly to systems and methods that create cryptographic keys for subscribers.

BACKGROUND OF THE INVENTION

In typical public key cryptographic systems, digital signature key pairs (a private key and a public key) are used to authenticate a digital signature of a subscriber to ensure that a message sent by a subscriber actually came from the subscriber sending the message. In addition to digital signature key pairs, encryption key pairs are also generally used to encrypt the data being sent from one subscriber to another subscriber. Certificates are generated by a trusted certification authority for the public keys of the private/public key pair to certify that the keys are authentic and valid. The public keys and certificates are used for two main purposes: verifying digital signatures and encrypting information. Such a system is a two key pair system. The receiver of a digitally signed e-mail or documents for example, uses the public key in the sender's verification certificate to verify the digital signature of the sender. A user wishing to send encrypted e-mail first encrypts the e-mail with a random symmetric key, then uses the intended receiver's public encryption key to encrypt the symmetric key and then attaches the encrypted symmetric key to the encrypted e-mail so that the receiver can decrypt the e-mail.

Hence, a subscriber (e.g., node, standalone unit, software application or other suitable entity) sending a message sends the data with its digital signature along with a certificate. The certificate has the certification authority signature. A receiver validates the digital signature in the received certificate. Each subscriber stores a certification authority public key to verify that the certificate was signed by the certification authority. A digital signature certificate typically includes a user public key, a user name and a signature of the certification authority. Each sender has a copy of its own certificate. To send an encrypted message, a sender accesses a directory, such as an onboard subscriber cache memory or other certificate storage medium to get a copy of the encryption certificate for a specified receiver (other subscriber).

Some information security systems that are public key based systems, support one key pair, wherein the one key pair is used to both encrypt information and to apply digital signatures. Other information security systems use the two key pair approach as indicated above. A three key pair approach has been proposed in Secured Electronic Information Society paper entitled "Seis-S10-Seis Certificate Policy, High Assurance General Id Certificate With Private Key Protected In An Electronic Id Card, Version 1.0". This three key pair approach defines one key pair to be used as an encryption key pair for key encipherment, one key pair is used as an authentication key pair is used for digital signatures and the third key pair is used for non-repudiation usages (e.g., digital signatures having longer lives). However, with all of these known approaches, such systems typically support only a fixed number of keys or key pairs and/or fixed types of key pairs.

For example, conventional public key cryptography systems and other cryptographic systems allow the replacement of a symmetric key or public key pair when the key expires, but typically only the same type of key pair or key is allowed to be used. Where a new key pair is desired, such as when a key pair expires, there typically needs to be an out of band communication to ensure that the critical keys are not obtained by an unscrupulous party. As such, there are typically manual processes for generating and transferring key information.

When an additional key pair is required (rather than the replacement of an existing key), new application software has to typically be loaded that can accommodate a different security structure having a different number of key pairs since applications typically are hard coded to accommodate a specific cryptographic approach. Changes required to allow a subscriber to interface with another subscriber or management server having a different number of key pairs or a different number of keys, generally require the systems to be shut down and reinitialized with new codes to allow the subscribers to be cryptographically compatible. With a greater number of information security infrastructures available, it would be desirable to have a system that can support the dynamic variation of the number of keys (e.g., symmetric keys) or key pairs to allow N key pairs and associated credentials to be automatically generated without reinitializing a subscriber. Hence, it would be desirable if there was a system that allowed a subscriber, such as a software application or processing unit, to perform an initial log in with existing security credentials and dynamically update the existing credentials set by, for example, adding additional key pairs and/or different types of key pairs.

Inter-operability problems arise between infrastructures using dual key pairs and infrastructures using one key pair. In addition, it can be difficult to enhance security architectures around a fixed number of key pairs when it is desired to increase the number of fixed key pairs. Typically, the number of key pairs are fixed, but the actual key pairs may be revoked and new key pairs may be issued for the same purpose. These may be generated through an off-line generation technique. As known in the art, additional security credential information is used with key pairs such as the public key certificates.

In addition, Internet browsers are known which allow adding key pairs and the maintenance of key pairs by using a list of key pairs where each key pair is typically dedicated to one CA. Also, a user has to request each key pair from each certificate generator or service provider. For each certification authority to which a browser enrolls, a key pair is generated and a certificate is registered and issued.

Consequently, a need exists for an improved information security system that can dynamically create security keys for subscribers that already have a preexisting security credential set.

BRIEF DESCRIPTION OF THE DRAWINGS

The below-described invention will be more readily understood in view of the described drawings.

FIGS. 2a and 2b illustrate a flow chart of one example of the operation of the system shown in FIG. 1a.

DETAILED DESCRIPTION OF THE PREFERRED EMBODIMENT

Briefly, an apparatus and method for dynamically creating security keys for a subscriber, having at least one preexisting security credential set, allows the configuration for N key pairs or N keys (where the cryptographic system is a symmetric key system). Such a system provides flexibility in assigning cryptographic algorithms and cryptographic keys to facilitate a change in algorithm without requiring reinitialization of a processing unit or subscriber. In addition, there can be a change in signing algorithm from message to message, for example. The apparatus and method provides a configurable security key manifest, such as a template or table, operative to contain a non-prespecified number of security keys. A security officer or other source may input key configuration data through a graphic user interface template or other suitable mechanism to configure the security key manifest. Once configured (populated), the apparatus dynamically controls the generation of at least one new security key for the subscriber based on received key attribute data and based on the differences in current and prior security key manifests.

One example of a configured security key manifest may include, for example, a key pair manifest (or a symmetric key manifest) which may be a list of key pair records. Each record contains information about a class of key pairs and attributes for each key pair. The manifest is in effect an indication from a key manifest generator's point of view as to what collection of key pairs, or keys, a subscriber should have. The manifest is maintained on a per user basis, per application basis, per group basis, or any other suitable basis.

In one embodiment, a key manifest generator generates an updated security key manifest, such as a configured key manifest, and digitally signs the key manifest and publishes it in a repository which may be accessed by a suitable subscriber. The subscriber compares the updated security key manifest after verifying the digital signature and compares it to the preexisting credential set of the subscriber. Where there is a difference between the updated security key manifest and the preexisting credential set for a given application or subscriber, the subscriber updates the preexisting credential set based on the comparison by, for example, generating an additional key pair if the updated security key manifest indicates that the subscriber must have a different number or types of key pairs.

Figure 1A:
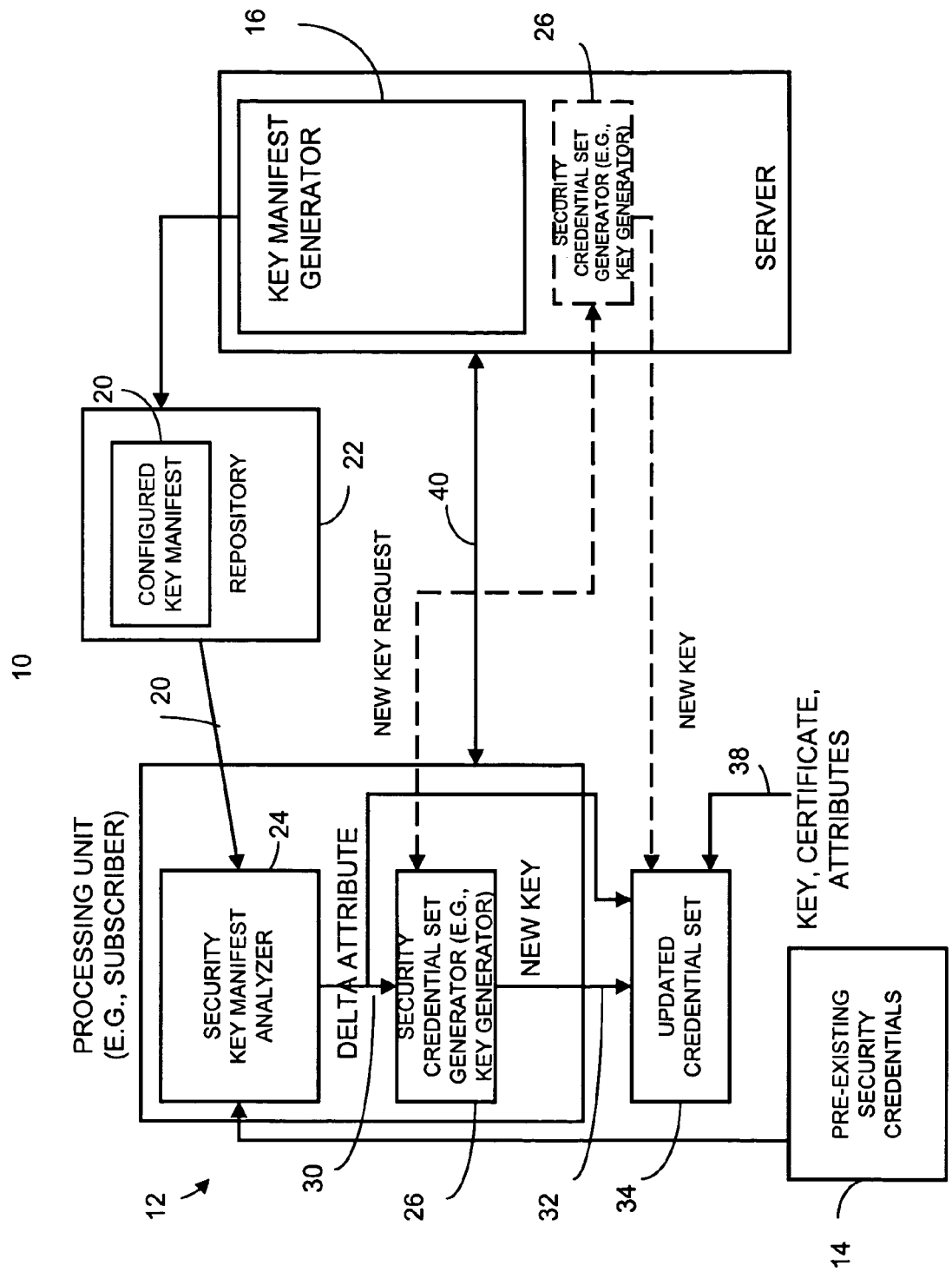
FIG. 1a is a block diagram illustrating one embodiment of an apparatus for facilitating dynamic creation of security keys for a subscriber having at least one previously existing security credential set in accordance with one embodiment of the invention.

FIG. 1a illustrates an example of an apparatus 10 which facilitates dynamic creation of security keys for a subscriber 12 where the subscriber has a preexisting cryptographic security key as part of preexisting security credentials 14. The subscriber 12 may be any suitable processing unit, software application or other entity which requires security credentials to provide information security. For example, the apparatus 10 may be incorporated in a public key cryptography system, symmetric key cryptography system or any other suitable system. For purposes of describing the invention, the apparatus 10 will be assumed to be in a public key-based cryptography system. When applied to such a system, the preexisting security credentials may include, for example, a dual key pair set of an encryption pair and signing key pair as known in the art. Preexisting security credentials may include, in addition to a cryptographic security key or key pair, certificate information and other suitable security related information if desired. The preexisting security credentials may be stored in onboard RAM, an offboard hardware token or in any other suitable location. In any event, the subscriber has a preexisting security credential set 14.

The apparatus 10 also includes a key manifest generator 16 which may be a suitably programmed server, or other suitable processing unit. A key manifest generator 16 provides a configurable security key manifest operative to contain a non-prespecified number of security keys. By way of example, the configurable security key manifest may be a configurable security key manifest template presented through a graphic user interface. The configurable security key manifest receives new key attribute data through the configurable security key manifest template. The new key attribute data may be input, for example, through a keyboard or touch screen by a security officer. New key attribute data may include, for example, data representing a number of key pairs for a given subscriber, the key size for each key in the pair, data representing key usage such as whether the key pair is used for encryption, digital signature, nonrepudiation, or some other usage, key maintenance data (e.g., attributes), such as whether or not the keys are to be backed up and if so, whether they shall be backed up at a central authority or other location, which cryptographic algorithm should be used for the encryption process, subscriber identification data identifying which subscriber the new key attribute data is for, and authentication data, such as a digital signature of a trusted authority such as a key manifest generator, or any other suitable attribute information. Once the new key attribute data is accepted, a configured security key manifest 20 is formed containing the new key attribute data.

The configured security key manifest 20, may be stored by the key manifest generator 16 in a suitable repository 22 or otherwise provided to the appropriate subscriber. The configured security key manifest may be stored to be pushed to one or more subscribers or stored so that it may be pulled or otherwise accessed by one or more subscribers.

The apparatus 10 also includes at least one security key manifest analyzer 24 operatively coupled to obtain the configured key manifest 20, and a security credential generator 26 operatively coupled to the security key manifest analyzer 24. The security key manifest analyzer 24 receives a preexisting security credential set 14 and analyzes the configured security key manifest 20 to determine a difference in key attributes among the key attributes in the preexisting credential set and the key or attribute data in the configured security key manifest 20. The delta ($\Delta$), or difference in attributes data 30 serves as input to the security credential set generator 26. The security credential set generator 26 dynamically generates at least one new security key for the subscriber based on the received key attribute data contained in the configured security key manifest 20, namely the new key attribute data not already in the preexisting security credential set.

The security credential set generator 26 includes a cryptographic key generator, such as any suitable public key pair generator or symmetric key generator, operative to generate a new public key pair 32, or symmetric key where appropriate, based on the content of the configured security key manifest 20. The new public key pair, for example, then becomes part of an updated credential set 34.

The security key manifest analyzer 24 compares an updated security key manifest (i.e., the configured key manifest 20) to the preexisting credential set 14. The preexisting credential set 14 contains at least one security key. The security credential set generator 26 facilitates updating a preexisting credential set 14 to generate the updated security credential set 34 based on the comparison between the updated security key manifest and the preexisting cryptographic credential set.

The updated security credential set 34 may be stored, for example, as a list by the subscriber in any suitable storage location and serves as the new preexisting credential set. The credential set also includes certificates and associated attributes for controlling other aspects of the subscriber. For example, an original credential set having an RSA signing key and corresponding verification certificate may be updated to also include a DSA signing key and verification certificate, and attributes indicating usage (e.g., for securing email versus a file on disk). As shown by communication link 40 the public key certificate, for example, of a newly generated public key of a newly generated public key pair may be generated by the key manifest generator 16 and sent to the subscriber unit for storage in the updated credential set. However, any suitable communication of the public key certificate, as known in the art, may be used. In addition, alternatively, the security credential set generator 26 may also be located in the server or part of any suitable unit.

The security key manifest analyzer 24 continuously analyzes the configured security key manifest from repository 22 to determine whether another updated configured security key manifest has been published for a given subscriber based on the subscriber ID data into the manifest. As such, it continuously analyzes the content of the configured security key manifest to ensure that configuration information is suitably processed in a timely manner. It will be recognized, however, that continuous analysis may not be needed, for example, where the key manifest generator 16 pushes the configured key manifest to a subscriber or if a subscriber only analyzes the configured key manifest upon notification that an application requires security keys to be used. If desired, no subscriber ID data need be used. In such a case, the security key manifest may be the same for a plurality of subscribers. The key manifest analyzer 24 is used to determine the suitable security keys necessary for a given operation.

Figure 1B:
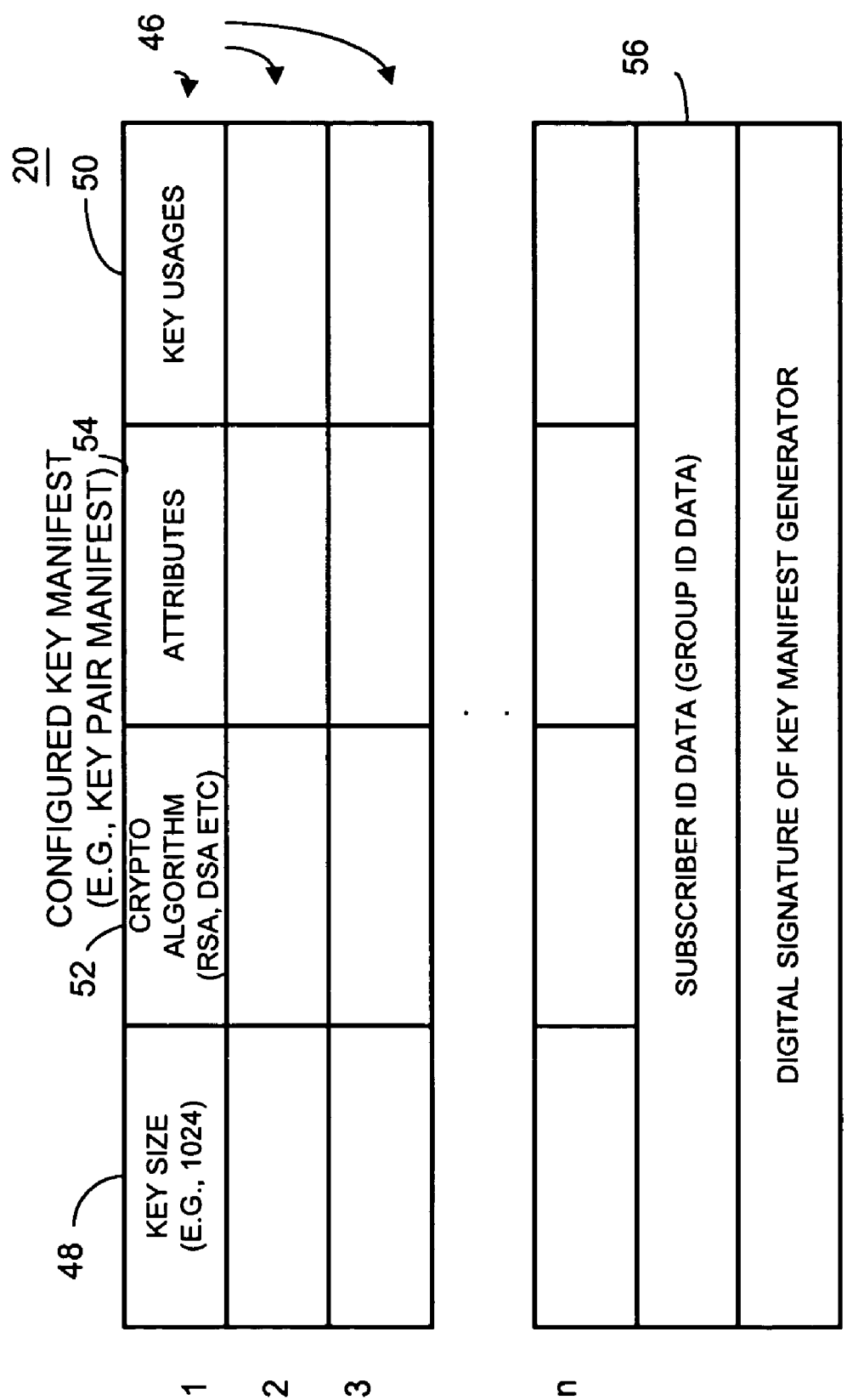
FIG. 1b is a graphic illustration of a configured key manifest in accordance with one embodiment of the invention.
Figure 2A:
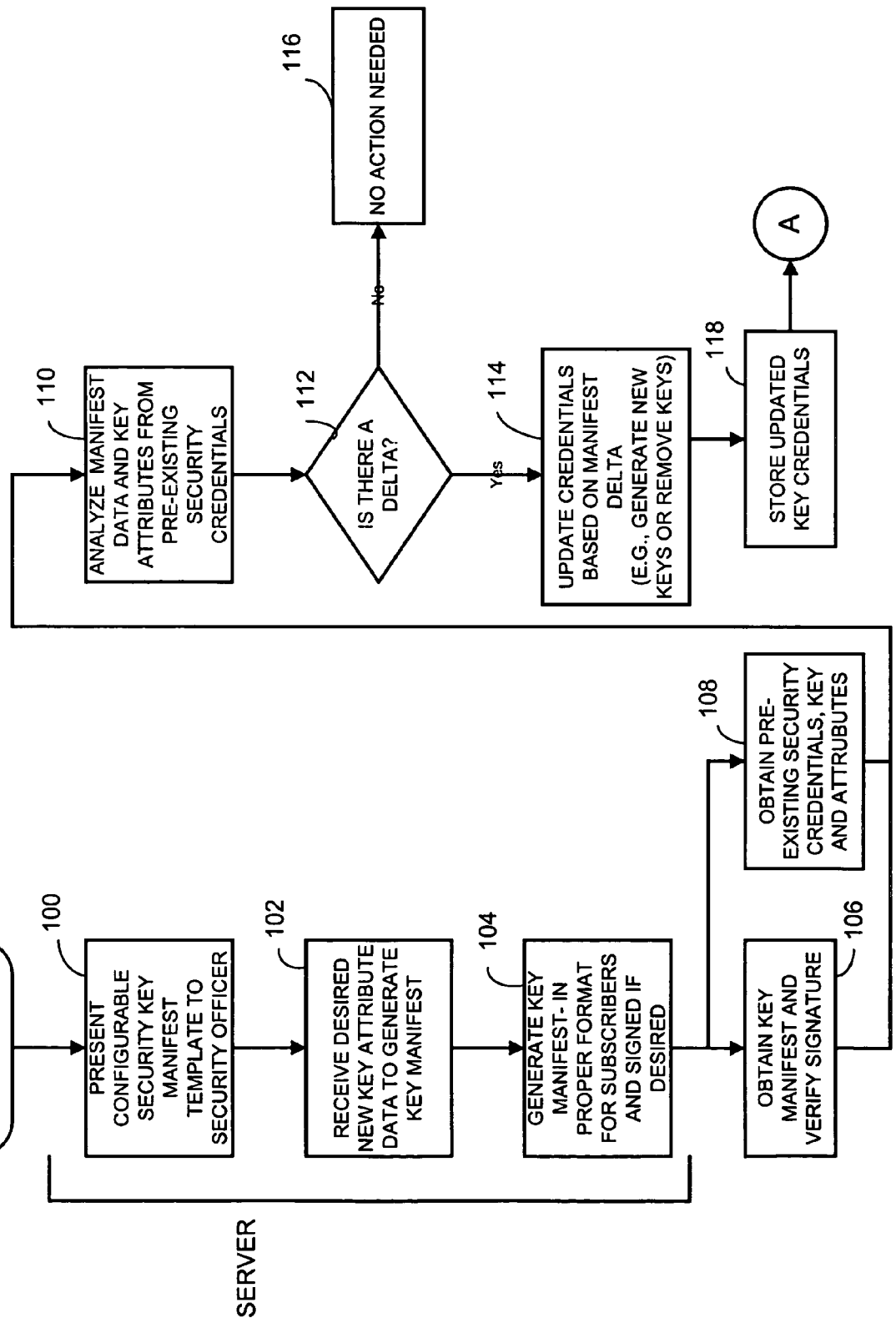
Figure 2B:
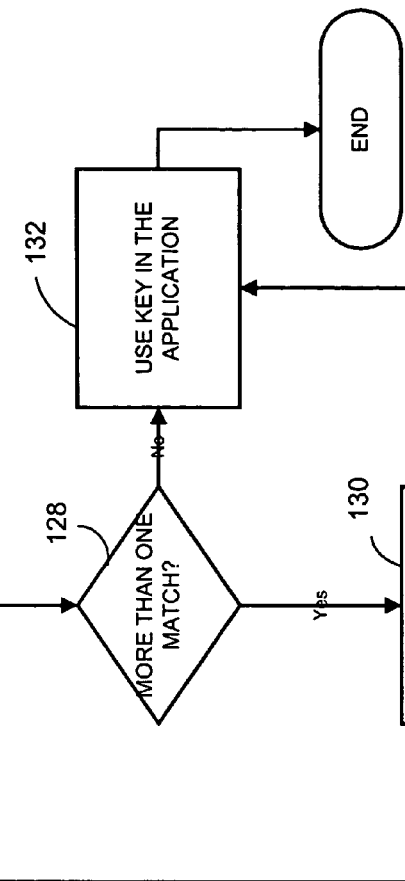
Figure 2B:
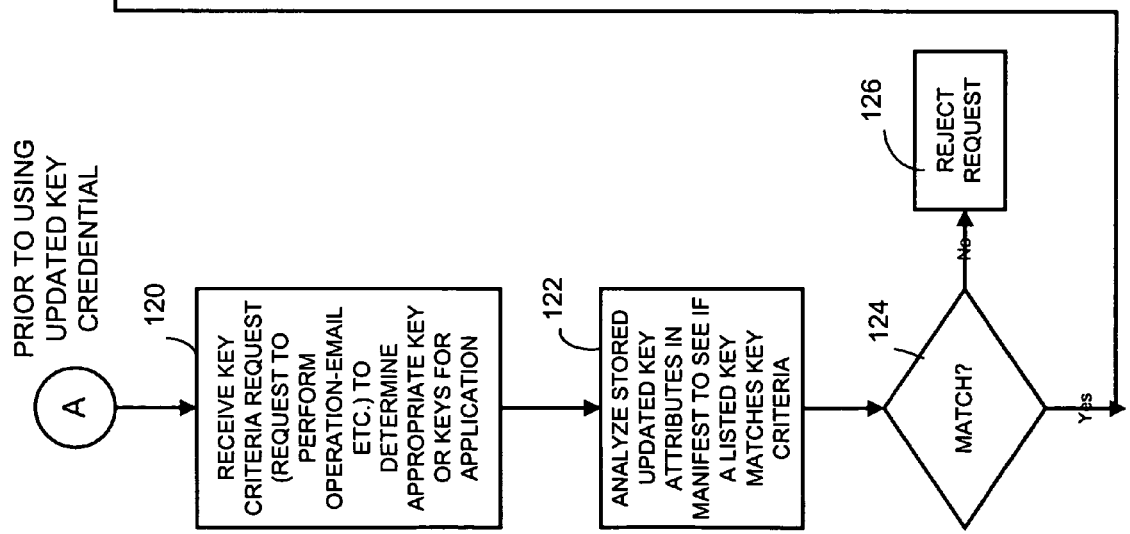

Referring also to FIG. 1*b*, a configured security key manifest is shown as a key pair manifest. However, it will be recognized that a symmetric key manifest or other suitable key manifest may also be used. As shown, the configured security key manifest 20 includes desired new key attribute data 46 for each key pair up to N key pairs. The configured security key manifest 20 includes updated data, mainly key attribute data representing at least one of: key size 48, key usages 50, cryptographic algorithm to be used 52, and other attributes 54, such as key maintenance attributes and authentication data. The configured security key manifest 20 may also include data representing subscriber identification data 56. For example, key maintenance attributes may be data representing how long to use the keys (key life span).

The key manifest generator 16 includes a digital signer operatively responsive to sign a configured security key manifest. As such, each configured security key manifest 20 preferably includes a digital signature of the key manifest generator that is trusted by the subscriber unit utilizing the configured key manifest information. The key manifest analyzer 24 receives the digitally signed configured security key manifest and passes it through a signature verification engine as known in the art to ensure that the information came from a trusted source and that the information is not otherwise invalid. As such, the digitally signed configured security key manifest may be in the form of a signed certificate such as described in X.509V3. The security key manifest analyzer 24 compares the updated security key manifest (the configured key manifest 20) to the preexisting credential set containing at least one preexisting cryptographic security key.

The security credential set generator 26 facilitates updating of the preexisting credential set by generating a new key if the configured security key manifest indicates that a new key needs to be added. Also, a key may be removed if its attributes do not appear in the configured manifest. As such, input information such as the content of the configured security key manifest may be a local data file, user provided input, data returned in response to a directory query, new data posted to a repository entry, session data received from another party such as a server, or store and forward data received such as by e-mail. The key manifest analyzer determines any differences between the preexisting credential set and the credential set defined by the configured security key manifest. Once a difference is determined, the subscriber, carries out, through the security key generator or any other suitable security credential generating mechanisms, a sequence of actions to acquire new credentials such as giving a new certificate from a third party or generating a self-signed certificate in addition to generating new keys or removing keys. Key credentials may augment the existing set or may entirely replace the existing set. Replacement may be desirable, where existing keys are of a given bit length that are no longer considered secure or attributes or usages associated with existing keys become obsolete.

Referring to FIGS. 1*a*–2*b*, the apparatus 10 through the processing unit containing the key manifest generator 16, presents the configurable security key manifest template to a security officer as shown in Block 100. As shown in Block 102, the graphic user interface receives the desired new key attribute data to generate a configured security key manifest. As shown in Block 104, the system generates the configured security key manifest in a proper format for subscribers and digitally signs the configured security key manifest if desired. As such the system generates an updated security key manifest as the configured security key manifest to contain data representing at least one of key size, key usage, key maintenance attributes, cryptographic algorithm used, subscriber identification data and authentication data for at least one subscriber. The subscriber obtains the configured key manifest and verifies the signature of the signed manifest as shown in Block 106. The subscriber also obtains the preexisting security credentials, such as the currently used key pairs or keys and their associated attributes. This is shown in Block 108. As shown in Block 110, the subscriber analyzes the manifest data (key attributes) from the preexisting security credentials. If there is a difference in key attributes for a given key pair or if there are new attributes for new keys, as shown in Block 112, the subscriber updates the credentials based on the difference data 30, such as generating new keys or removing keys from the credential set as shown in Block 114. If there is no difference between the configured security key manifest and the preexisting credential set, no action is needed as shown in Block 116.

As shown in Block 118, once new credentials are generated, they are stored to update the credential set for a given subscriber. Prior to using the updated key credentials, the subscriber receives a key criteria request as shown in Block 120, which may be, for example, a request from a software application to perform an operation such as e-mail or other operation. The key criteria request is used to determine the appropriate key or keys for a given application. For example, if an e-mail application is being used, the application will request that digital signature and/or encryption keys be used. As such, the subscriber will then obtain the appropriate set of keys or appropriate keys based on the attribute usage data. As shown in Block 122, the subscriber analyzes the stored updated key attributes in the manifest to see if a key matches the key criterion in the request. This is shown in Block 124. If there is no match, the request is rejected as shown in Block 126. If there is more than one match as indicated by Block 128, the user is asked to select which key or keys to use as shown in Block 130. Alternatively, the subscriber may automatically select which keys to use based on default attributes. As shown in Block 132, if only one match exists between a key criteria request and the criteria data stored in the updated credential set from the configured manifest, the key is then used in the application. As such, the apparatus dynamically controls through a configured security key manifest the generation of a new security key for a subscriber based on the received key attribute data that was used to populate a configurable key manifest.

Referring back to FIG. 2b, the key pair manifest is a list of key pair records with each record containing information about a class of key pair attributes. A key class does not exist per key pair, but rather is differentiated from others by its unique set of attribute values. For example, there may be a long history of key pairs associated with a particular key class. Key classes are not typically distinguished by key usage. If there is a desire to have simultaneous DSA and RSA signing keys key pairs, for example, there may be an additional key class defining a key type as one to be used for RSA signing and a different key class indicating that the key type is for a DSA signing key. In addition, other attribute information might be data representing the content of associated public key certificates, such as validity periods and policy extensions.

Alternatively, the key manifest may be used to generate keys upon initialization. In this embodiment, there may not be pre-existing cryptographic security keys.

Also, it will be recognized that the invention or any suitable components therein may be embodied as hardware, or any suitable combination of hardware or software. If desired, the processes described may be carried out by a suitable programmed processor or plurality of processors. Accordingly, memory, such as a harddrive, standalone memory, micro-memory, CD ROM, DVD or any suitable memory device may contain executable instructions that when read by a one or more processing units, carries out one or more steps of the afore-described apparatus and methods.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for dynamically creating security keys for a subscriber having at least one preexisting security credential set having at least one pre-existing cryptographic security key, comprising the steps of:
   providing a configurable security key manifest operative to contain a non-prespecified number of security keys;
   accepting new key attribute data to produce a configured security key manifest; and
   dynamically controlling, through a configured security key manifest, the generation of at least one new security key for the subscriber based on received key attribute data contained in the configured security key manifest to allow the subscriber to update the pre-existing credential set based on the new security key.

2. The method of claim 1 including the step of generating a new public key pair for the subscriber based on content of the configurable security key manifest.

3. The method of claim 1 including the step of receiving data representing desired new key attribute data by presenting a configurable security key manifest template and receiving new key attribute data through the configurable security key manifest template.

4. The method of claim 1 wherein the step of providing the configurable security key manifest operative to contain a non-prespecified number of security keys includes storing a configured security key manifest for push based or pull based access by the subscriber.

5. The method of claim 1 wherein the configured security key manifest includes updated data representing at least one of: key size, key usage, key maintenance attributes, cryptographic algorithm used, subscriber identification data and authentication data.

6. The method of claim 1 including the steps of:
   generating an updated security key manifest as the configured security key manifest to contain data representing at least one of: key size, key usage, key maintenance attributes, cryptographic algorithm used, subscriber identification data and authentication data, for the at least one subscriber; and
   comparing the updated security key manifest to the pre-existing credential set containing at least one pre-existing cryptographic security key; and
   updating the pre-existing credential set based on the comparison.

7. The method of claim 6 wherein the step of updating the pre-existing credential set includes the step of generating a new public key pair for the subscriber based on content of the configurable security key manifest.

8. The method of claim 1 including the steps of:
   generating at least one new key pair in response to content of the configured security key manifest;
   continuously analyzing the configured security key manifest content, prior to using a security key pair to determine the suitable security keys necessary for a given operation.

9. The method of claim 1 including the steps of:
   digitally signing the configured security key manifest by a trusted key manifest generator;
   receiving the digitally signed configured security key manifest;
   obtaining the pre-existing credential set; and
   prior to analyzing content of the configured security key manifest, verifying the digital signature of the digitally signed configured security key manifest.

10. The method of claim 6 wherein the step of comparing includes determining a difference in security key information between the updated security key manifest and the pre-existing cryptographic security key.

11. The method of claim 1 wherein the security key is a key pair and wherein the step of dynamically controlling the generation of the at least one security key includes dynamically controlling the number of key pairs for a subscriber in response to content of the configured security key manifest.

12. The method of claim 6 wherein the step of updating the pre-existing credential set includes generating digitally signed data structures corresponding to at least one of a newly generated public key pair.

13. The method of claim 1 wherein the at least one new security key is a symmetric key.

14. The method of claim 3 wherein the data representing desired new key attribute data includes data representing at least one of: key size, key usage, key maintenance attributes, cryptographic algorithm used, subscriber identification data, authentication data.

15. A method for dynamically creating security keys for a subscriber having at least one preexisting security credential set having at least one pre-existing cryptographic security key, comprising the steps of:
   providing a configurable security key manifest operative to contain a non-prespecified number of security keys;
   receiving, in response to providing the configurable security key manifest, data representing desired new key attribute data by presenting a configurable security key manifest template and receiving new key attribute data through the configurable security key manifest template;
   dynamically controlling, through a configured security key manifest, the generation of at least one new security key for a subscriber based on the received key attribute data, wherein the configured security key manifest is an updated security key manifest containing data representing at least one of: key size, key usage, key maintenance attributes, cryptographic algorithm used, subscriber identification data and authentication data;
   comparing, by the subscriber, the updated security key manifest to the pre-existing credential set containing at least one of: key size data, cryptographic algorithm designation data, key attribute data and key usage data for; and
   updating, by the subscriber, the pre-existing credential set based on the comparison by generating at least one new key for the subscriber based on content of the configurable security key manifest.

16. The method of claim 15 wherein the step of providing the configurable security key manifest operative to contain a non-prespecified number of security keys includes storing the configured security key manifest for push based or pull based access by the subscriber.

17. The method of claim 16 wherein the step of updating the pre-existing credential set includes the step of generating a new public key pair for the subscriber based on content of the configurable security key manifest.

18. The method of claim 15 including the steps of:
   generating at least one new key pair in response to content of the configured security key manifest; and
   continuously analyzing the configured security key manifest content, prior to using a security key pair to determine the suitable security keys necessary for a given operation.

19. The method of claim 15 including the steps of:
   digitally signing the configured security key manifest by a trusted key manifest generator;
   receiving, by the subscriber, the digitally signed configured security key manifest;
   obtaining, by the subscriber, the pre-existing credential set; and
   prior to analyzing content of the configured security key manifest, verifying, by the subscriber, the digital signature of the digitally signed configured security key manifest.

20. The method of claim 15 wherein the step of comparing includes determining a difference in security key information between the updated security key manifest and the pre-existing key data.

21. The method of claim 15 wherein the security key is a key pair and wherein the step of dynamically controlling the generation of the at least one security key includes dynamically controlling the number of key pairs for a subscriber in response to content of the configured security key manifest.

22. The method of claim 15 wherein the step of updating the pre-existing credential set includes generating digitally signed data structures corresponding to at least one of a newly generated public key pair.

23. The method of claim 15 wherein the at least one new security key is a symmetric key.

24. The method of claim 15 wherein the data representing desired new key attribute data includes data representing at least one of: key size, key usage, key maintenance attributes, cryptographic algorithm used, subscriber identification data, authentication data.

25. An apparatus for facilitating dynamic creation of security keys for a subscriber having at least one preexisting security credential set having at least one pre-existing cryptographic security key, comprising:
   at least one security key manifest analyzer operative to receive the at least one preexisting security credential set and operative to process a configured security key manifest that was configured by accepting new key attribute data to produce a configured security key manifest; and
   at least one security credential set generator operative to dynamically generate, from the configured security key manifest, at least one new security key for a subscriber based on received key attribute data contained in the configured security key manifest to allow the subscriber to update the pre-existing credential set based on the new security key.

26. The apparatus of claim 25 including a cryptographic key generator operative to generate a new public key pair for the subscriber based on content of the configured security key manifest.

27. The apparatus of claim 25 wherein the security key manifest analyzer compares an updated security key manifest to the pre-existing credential set containing at least one pre-existing cryptographic security key; and wherein the at least one security credential set generator facilitates updating of the pre-existing credential set based on the comparison.

28. The apparatus of claim 27 wherein the at least one security credential set generator generates a new public key pair for the subscriber based on content of the configured security key manifest.

29. The apparatus of claim 25 wherein the security key analyzer continuously analyzes the configured security key manifest content and wherein the key manifest analyzer is used to determine the suitable security keys necessary for a given operation.

30. The apparatus of claim 25 wherein the security key manifest analyzer receives a digitally signed configured security key manifest, obtains the pre-existing credential set; and prior to analyzing content of the configured security key manifest, verifying the digital signature of the digitally signed configured security key manifest.

31. The apparatus of claim 30 wherein the key manifest analyzer determines a difference in security key information between the updated security key manifest and the pre-existing key data.

32. The apparatus of claim 25 wherein the security key is a key pair and wherein the security credential generator generates a number of key pairs for a subscriber in response to content of the configured security key manifest.

33. The apparatus of claim 27 wherein the step of updating the pre-existing credential set includes generating digitally signed data structures corresponding to at least one of a newly generated public key pair.

34. The apparatus of claim 25 wherein the at least one new security key is a symmetric key.

35. The apparatus of claim 25 wherein the data representing desired new key attribute data includes data representing at least one of: key size, key usage, key maintenance attributes, cryptographic algorithm used, subscriber identification data, authentication data.

36. An apparatus for facilitating dynamic creation of security keys for a subscriber having at least one preexisting security credential set having at least one pre-existing cryptographic security key, comprising:
at least one key manifest generator that provides the configurable security key manifest operative to contain a non-prespecified number of security keys,
wherein the key manifest generator receives data representing desired new key attribute data by presenting a configurable security key manifest template and receiving new key attribute data through the configurable security key manifest template.

37. The apparatus of claim 36 including storage operative for storing a configured security key manifest for push based or pull based access by the subscriber.

38. The apparatus of claim 36 wherein the configured security key manifest includes updated data representing at least one of: key size, key usage, key maintenance attributes, cryptographic algorithm used, subscriber identification data and authentication data.

39. The apparatus of claim 36 including a trusted key manifest generator operatively responsive to digitally sign the configured security key manifest.

40. The apparatus of claim 36 including at least one security key manifest analyzer operative to receive the at least one preexisting security credential set and operative to process a configured security key manifest; and
at least one security credential set generator operative to dynamically generate, from the configured security key manifest, at least one new security key for a subscriber based on received key attribute data contained in the configured security key manifest.

41. The apparatus of claim 40 including a cryptographic key generator operative to generate a new public key pair for the subscriber based on content of the configured security key manifest.

42. The apparatus of claim 40 wherein the security key manifest analyzer compares an updated security key manifest to the pre-existing credential set containing at least one pre-existing cryptographic security key; and wherein the at least one security credential set generator facilitates updating of the pre-existing credential set based on the comparison.

43. The apparatus of claim 42 wherein the at least one security credential set generator generates a new public key pair for the subscriber based on content of the configured security key manifest.

44. A method for dynamically creating security keys for a subscriber having at least one preexisting security credential set having at least one pre-existing cryptographic security key, comprising the steps of:
providing a configurable security key manifest operative to contain a non-prespecified number of security keys;
receiving data representing desired new key attribute data by presenting a configurable security key manifest template and receiving new key attribute data through the configurable security key manifest template;
dynamically controlling, through a configured security key manifest, the generation of at least one new security key for the subscriber based on received key attribute data contained in the configured security key manifest; and
storing the configured security key manifest for push based or pull based access by the subscriber.

45. A method for dynamically creating security keys for a subscriber having at least one preexisting security credential set having at least one pre-existing cryptographic security key, comprising the steps of:
providing a configurable security key manifest operative to contain a non-prespecified number of security keys;
dynamically controlling, through a configured security key manifest, the generation of at least one new security key for the subscriber based on received key attribute data contained in the configured security key manifest; and
receiving data representing desired new key attribute data by presenting a configurable security key manifest template and receiving new key attribute data through the configurable security key manifest template.

46. A method for dynamically creating security keys for a subscriber having at least one preexisting security credential set having at least one pre-existing cryptographic security key, comprising the steps of:
providing a configurable security key manifest operative to contain a non-prespecified number of security keys;
dynamically controlling, through a configured security key manifest, the generation of at least one new security key for the subscriber based on received key attribute data contained in the configured security key manifest;
digitally signing the configured security key manifest by a trusted key manifest generator;
receiving the digitally signed configured security key manifest;
obtaining the pre-existing credential set; and
prior to analyzing content of the configured security key manifest, verifying the digital signature of the digitally signed configured security key manifest.

47. A method for dynamically creating security keys for a subscriber having at least one preexisting security credential set having at least one pre-existing cryptographic security key, comprising the steps of:
providing a configurable security key manifest operative to contain a non-prespecified number of security keys;
dynamically controlling, through a configured security key manifest, the generation of at least one new security key for the subscriber based on received key attribute data contained in the configured security key manifest;
generating an updated security key manifest as the configured security key manifest to contain data representing at least one of: key size, key usage, key maintenance attributes, cryptographic algorithm used, subscriber identification data and authentication data, for the at least one subscriber;
comparing the updated security key manifest to the pre-existing credential set containing at least one pre-existing cryptographic security key;
updating the pre-existing credential set based on the comparison; and generating digitally signed data structures corresponding to at least one of a newly generated public key pair.

48. A method for dynamically creating security keys for a subscriber comprising the steps of:
providing a configurable security key manifest operative to contain a non-pre-specified number of security keys;
dynamically controlling, through a configured security key manifest, initial generation of at least one security key for the subscriber, based on received key attribute data contained in the configured secured key manifest; and
receiving data representing desired new key attribute data by presenting a configurable security key manifest template and receiving new key attribute data through the configurable security key manifest template.

49. The method of claim 48 including the step of generating a new public key pair for the subscriber based on content of the configurable security key manifest.

50. The method of claim 48 wherein the step of providing the configurable security key manifest operative to contain a non-prespecified number of security keys includes storing a configured security key manifest for push based or pull based access by the subscriber.

51. The method of claim 48 wherein the configured security key manifest includes updated data representing at least one of: key size, key usage, key maintenance attributes, cryptographic algorithm used, subscriber identification data and authentication data.

* * * * *